United States Patent
Ner et al.

(10) Patent No.: US 8,537,710 B2
(45) Date of Patent: Sep. 17, 2013

(54) MAXIMUM TRANSFER UNIT (MTU) OPTIMIZATION FOR ADVANCED WIRELESS NETWORKS

(75) Inventors: Haim S. Ner, Fair Lawn, NJ (US); Sagiv Draznin, Walnut Creek, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 187 days.

(21) Appl. No.: 13/102,096

(22) Filed: May 6, 2011

(65) Prior Publication Data
US 2012/0281559 A1 Nov. 8, 2012

(51) Int. Cl.
*H04L 12/26* (2006.01)

(52) U.S. Cl.
USPC .......................................... 370/252; 370/355

(58) Field of Classification Search
USPC ................. 370/349, 389, 252, 471, 473, 474, 370/476
See application file for complete search history.

(56) References Cited

U.S. PATENT DOCUMENTS

| | | | | |
|---|---|---|---|---|
| 6,212,190 B1 * | 4/2001 | Mulligan | ...................... | 370/400 |
| 6,564,267 B1 * | 5/2003 | Lindsay | ......................... | 709/250 |
| 7,012,913 B2 * | 3/2006 | Maturi | ........................... | 370/349 |
| 7,103,674 B2 * | 9/2006 | Brown et al. | .................. | 709/234 |
| 7,512,120 B2 * | 3/2009 | Takahashi et al. | ............ | 370/354 |
| 7,596,151 B2 * | 9/2009 | Kim | ............................... | 370/468 |
| 8,170,552 B2 * | 5/2012 | Patel et al. | ................. | 455/435.1 |
| 2003/0185208 A1 * | 10/2003 | Lee et al. | ...................... | 370/389 |
| 2005/0041635 A1 * | 2/2005 | Chung et al. | .................. | 370/351 |
| 2009/0303947 A1 * | 12/2009 | Karino et al. | ................. | 370/329 |

* cited by examiner

*Primary Examiner* — Brenda H Pham

(57) ABSTRACT

A network device is configured to identify a configured maximum segment size value, for a wireless access network associated with the network device, which is calculated to prevent fragmentation over the wireless access network. The network device is configured to receive, from a first computing device, a synchronization message including an initial maximum segment size value for a Transmission Control Protocol (TCP) socket connection between the first computing device and a second computing device that uses the wireless access network. When the initial maximum segment size value is larger than the configured maximum segment size value, the network device is configured to replace the initial maximum segment size value with the configured maximum segment size value to create a modified synchronization message, and send the modified synchronization message to the second computing device for establishing the TCP socket connection.

17 Claims, 10 Drawing Sheets

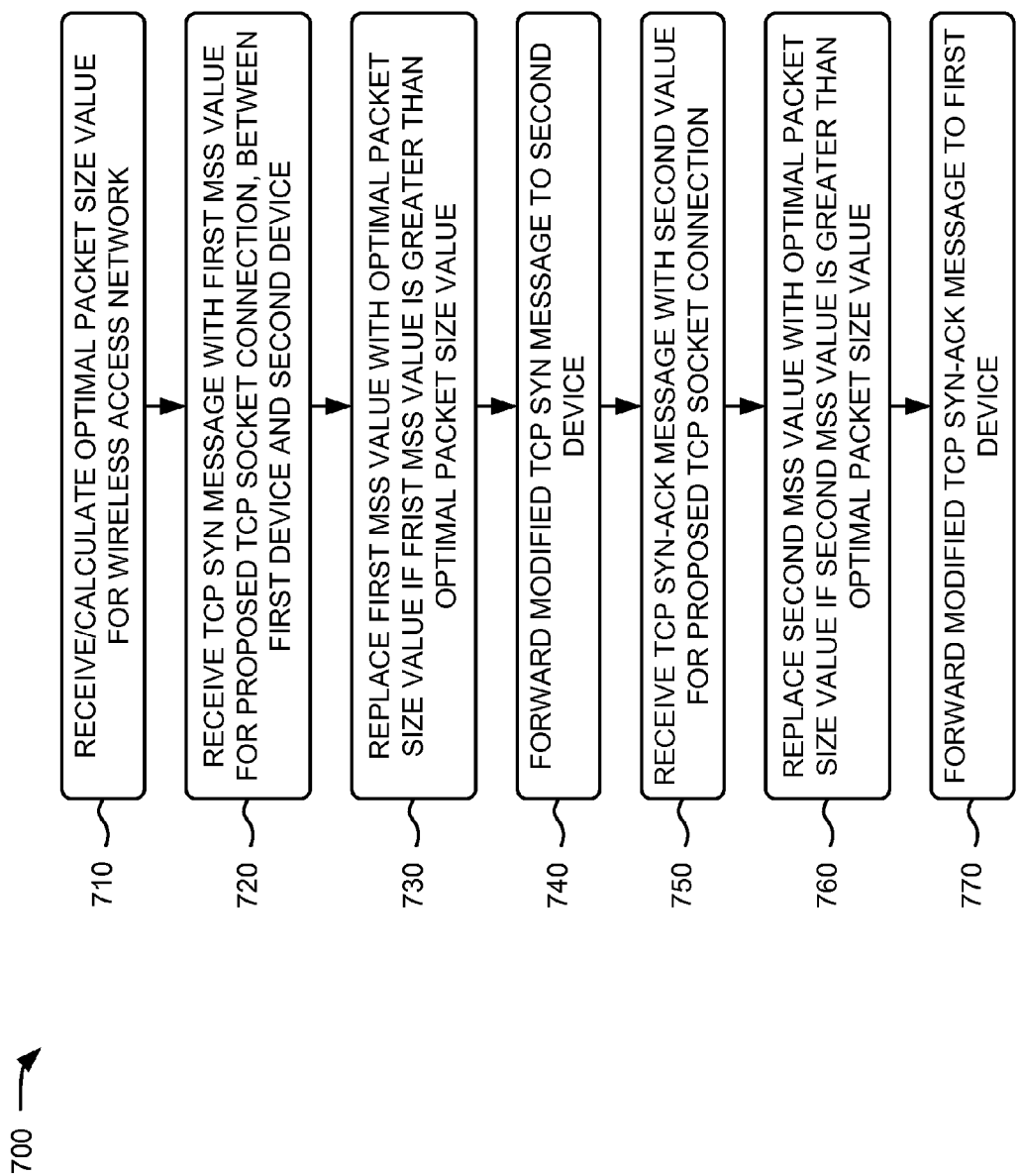

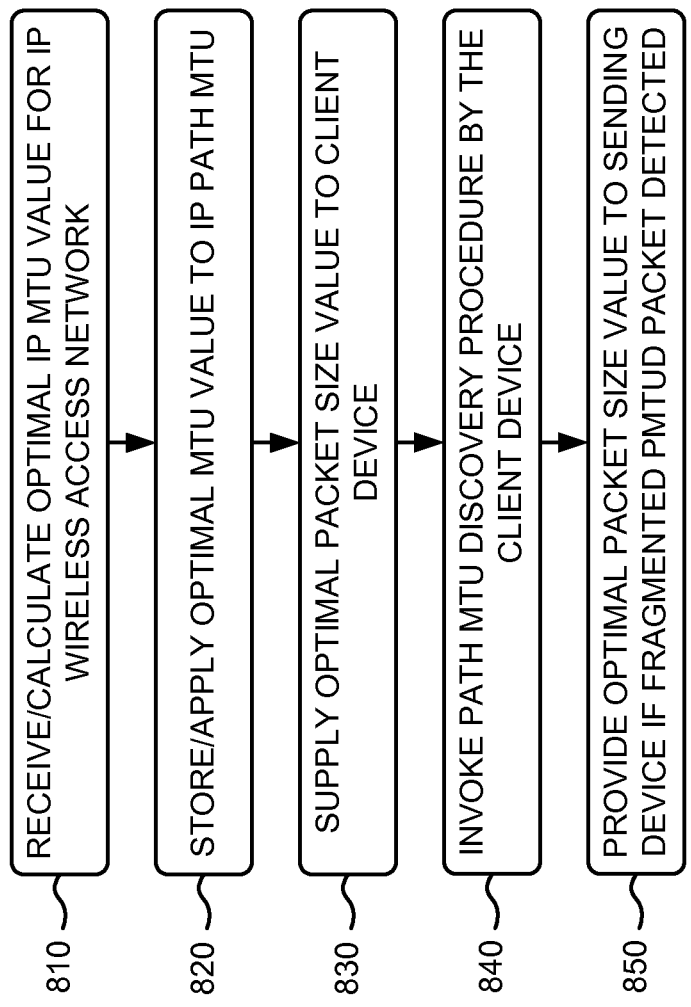

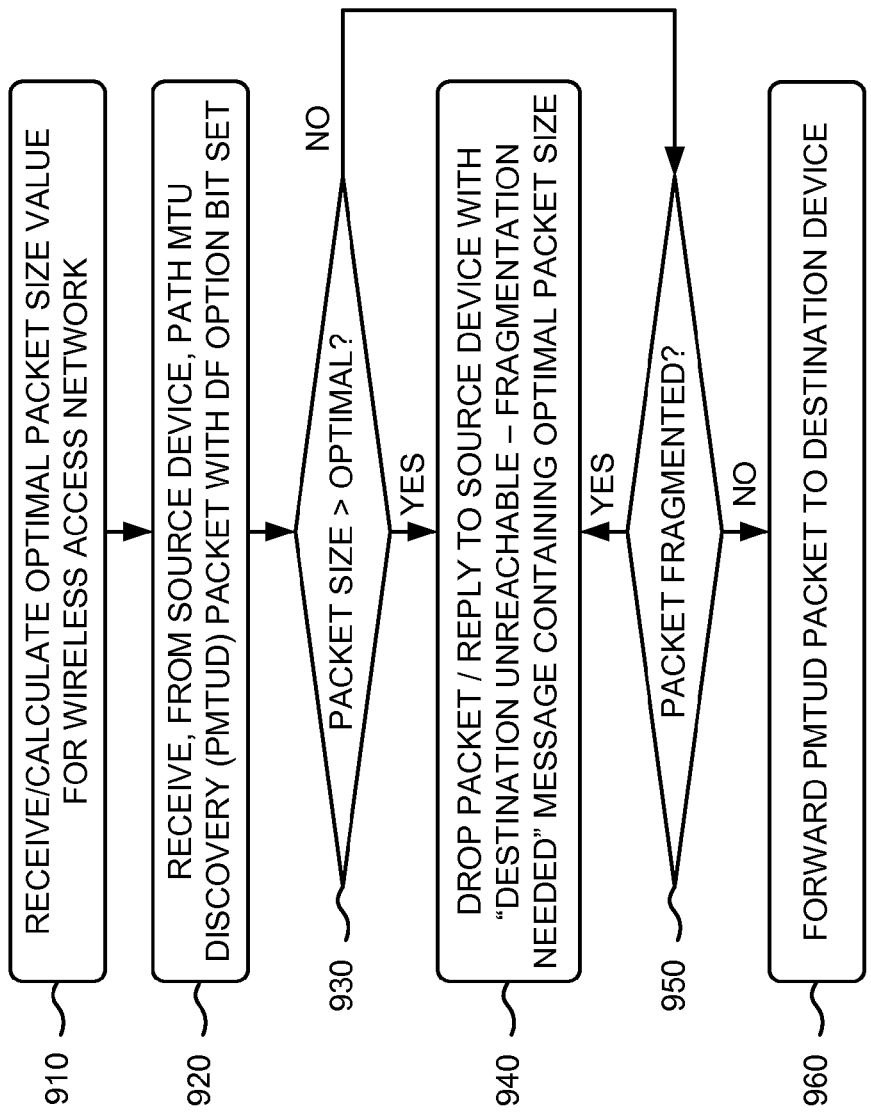

MAXIMUM TRANSFER UNIT (MTU) OPTIMIZATION FOR ADVANCED WIRELESS NETWORKS

BACKGROUND

Third generation (3G) and fourth generation (4G) wireless networks, as specified by the 3rd Generation Partnership Project (3GPP) include wireless access networks in which different application services (e.g., data services, voice over IP (VoIP) content, video content, etc.) can be delivered over Internet protocol (IP). Both IP and Transmission Control Protocol (TCP) define size limits for packets transmitted over a network. The IP maximum transmission unit (MTU) defines the maximum size of IP packet that can be transmitted. The TCP maximum segment size (MSS) defines the maximum number of data bytes in a packet (e.g., excluding the TCP/IP headers).

Typically, end users do not know the MTU size or the MSS that a network or a network segment in the TCP path can accommodate, and, therefore, the end user's operating system selects a default value (e.g., 1500 bytes) for the MTU size. However, the default value may not be supported over the wireless access network. When an IP packet is too large (e.g., the packet exceeds the MTU size and/or MSS), network devices may apply packet fragmentation to conform the packets to these size limits. This packet fragmentation can degrade performance.

BRIEF DESCRIPTION OF THE DRAWINGS

FIG. 7 is a flow chart of an example process for setting an optimal packet size for a wireless access network according to an implementation described herein;

FIG. 8 is a flow chart of an example process for signaling an optimal MTU size in a wireless access network according to an implementation described herein; and FIG. 9 is a flow chart of an example modified path MTU discovery process according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide communications between a network device, associated with a wireless access network, and end users to control a maximum packet size for devices communicating over the wireless access network. The maximum packet size may be configured to reduce/eliminate packet fragmentation over the wireless access network.

In one example implementation, the systems and/or methods may identify a configured maximum segment size (MSS) value, for a wireless access network associated with the network device, that is calculated to prevent fragmentation over the wireless access network. The systems and/or methods may receive, from a client device, a synchronization message including an initial MSS value for a TCP socket connection between the client device and a server device and using the wireless access network. When the initial MSS value is larger than the configured MSS value, the systems and/or methods may replace the initial maximum segment size value with the configured maximum segment size value to create a modified synchronization message, and may send the modified synchronization message to the server device.

In another example implementation, the systems and/or methods may receive an IP maximum transfer unit (MTU) value for a wireless access network, where the IP MTU value is calculated to prevent fragmentation over the wireless access network. The systems and/or methods may store, in a memory, the IP MTU value. The systems and/or methods may send, to a client device, a control message to set an IP path MTU to the IP MTU value and to invoke a path MTU discovery procedure, by the client device, using the IP MTU value.

As used herein in the context of TCP communications, the term "client" may generally refer a device that initiates a TCP session (e.g., via a TCP synchronization (SYN) message) with another device. As used herein in the context of TCP communications, the term "server" may generally refer to a device that responds (e.g., via a TCP SYN-acknowledgement (ACK) message) to a TCP session request from a client.

Figure 1:
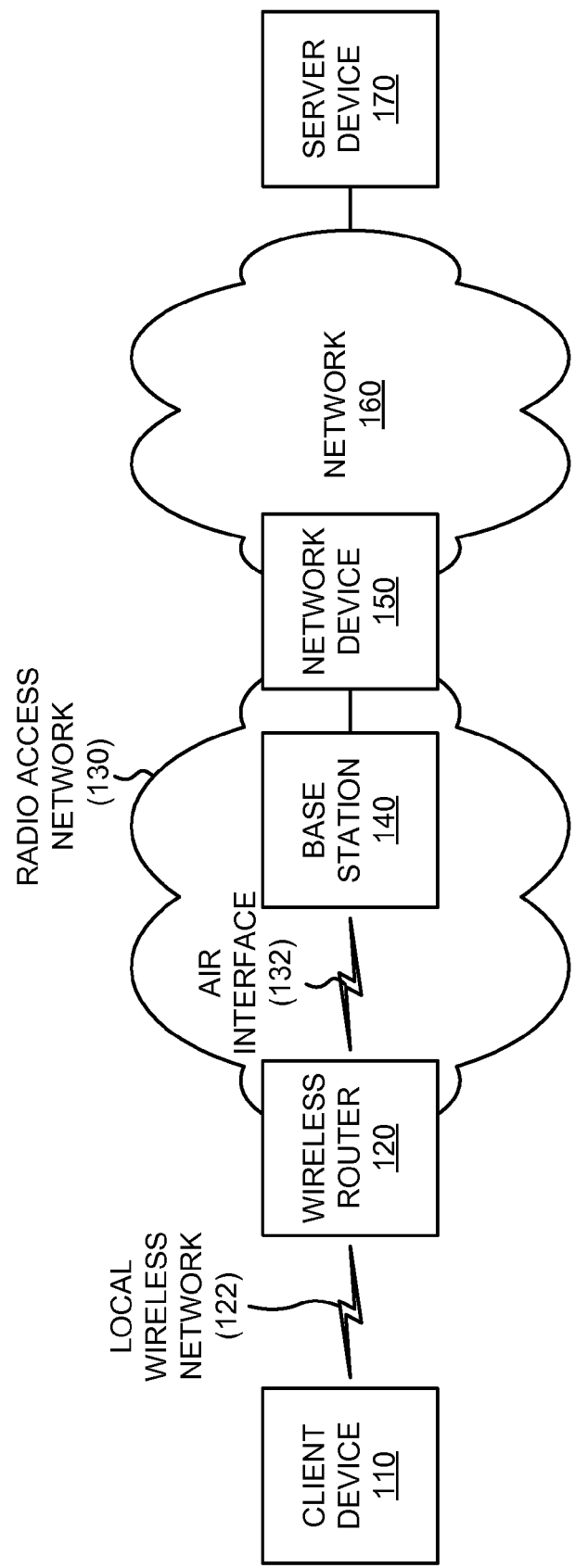
FIG. 1 is a diagram of an example network in which systems and/or methods described herein may be implemented.

FIG. 1 is a diagram of an example network 100 in which systems and/or methods described herein may be implemented. As illustrated, network 100 may include a client device 110, wireless router 120, a radio access network 130, a base station 140, a network device 150, a network 160 and a server device 170. Components of network 100 may interconnect via wired and/or wireless connections. One client device 110, wireless router 120, radio access network 130, base station 140, network device 150, network 160, and server device 170 have been illustrated in FIG. 1 for simplicity. In practice, there may be more client devices 110, wireless routers 120, radio access networks 130, base stations 140, network devices 150, networks 160, and/or server devices 170.

Client device 110 may include any device that is capable of communicating with network 160 via radio access network 130 (e.g., including wireless router 120, base station 140, and/or network device 150). For example, client device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer, a tablet computer, a global positioning system (GPS) device, a content recording device (e.g., a camera, a video camera, etc.), etc. In another example, client device 110 may include a fixed (e.g., provided in a particular location, such as within a subscriber's home) computation and/or communication device, such as a personal computer, a set-top box (STB), a television, a gaming system, etc. Further details of client device 110 are provided below in connection with, for example, one or more of FIGS. 2-4 and 6.

Wireless router 120 may include a device that is capable of communicating with client device(s) 110 using a local wireless network 122 to provide traffic to client device(s) 110 and/or to forward traffic from client device(s) 110. In one implementation, wireless router 120 may use an IEEE 802.11 (e.g., WiFi) protocol and/or an IEEE 802.15 (e.g., Bluetooth) protocol. For example, wireless router may provide a WiFi signal in a limited radius (e.g., 30-200 feet) for local connectivity. In another implementation, wireless router 120 may include an intelligent mobile hotspot or a mobile user device (e.g., a client device 110 or a "MiFi" device) acting like a WiFi router. An intelligent mobile hotspot may connect to IP wireless access networks to send/receive signals that allow Internet connectivity. The intelligent mobile hotspot may share that connection, through WiFi in a limited radius with other WiFi enabled devices, such as client device 110. In another implementation, wireless router 120 may connect to client device 110 via a wired connection. In another example, wireless router 120 may include a broadband home router. In still another implementation, client device 110 and wireless router 120 may be integrated as a single device. Wireless router 120 may include one or more repeaters, or may be replaced with a modem provided in client device 110.

Wireless router 120 may also communicate with base station 140, using an air interface 132, to receive traffic from base station 140 and/or to forward traffic to base station 140. Wireless router 120 may include a wireless gateway that provides a convergence point between wireless protocols (e.g., associated with base station 140) and IP protocols (e.g., associated with client device 110).

Radio access network 130 may include one or more devices for transmitting voice and/or data to mobile device 110 and network 160. In one example implementation, radio access network 130 may include wireless routers (e.g., wireless router 120), a group of base stations (e.g., base station 140), and a group of network devices (network device 150). Radio access network 130 may correspond to a CDMA2000 standard (e.g., a CDMA one times radio transmission technology (1×RTT) network, a CDMA evolution optimized data only (EV-DO) network, or a CDMA eHRPD network); a Global System for Mobile Communications (GSM) standard (e.g., a General Packet Radio Service (GPRS) network, an Enhanced Data Rates for GSM Evolution (EDGE) network, a Universal Mobile Telecommunications System (UMTS) network (also known as a wideband CDMA (W-CDMA) network), or a High Speed Packet Access (HSPA) network); or a Long Term Evolution (LTE) network as specified by the 3GPP; a WiMax network; etc. In one example, radio access network 130 may include air interface 132 between wireless router 120 and base station 140. Radio access network 130 may have a maximum packet size that can traverse air interface 132. When a packet is too large (e.g., the packet exceeds the MTU size and/or MSS), devices in radio access network 130 (e.g., wireless router 120, base station 140, and/or network device 150) may apply packet fragmentation to conform the packets to the maximum packet size.

Base station 140 may include one or more computation and/or communication devices that receive traffic from network device 150 and wirelessly transmit that traffic to client device 110/wireless router 120. Base station 140 may also include one or more devices that wirelessly receive traffic from client device 110/wireless router 120 and transmit that traffic to network device 150. Base station 140 may also monitor resource utilization information of the IP wireless access network. In some cases, base station 140 may also be referred to as an eNodeB. In another implementation, base station 140 may include a picocell, a femtocell, or another form of a cellular base station. In still another implementation, base station 140 may include or be associated with one or more wireless repeaters.

Network device 150 may include one or more data transfer devices, such as a mobile gateway, a router, a switch, a firewall, a hub, a bridge, a proxy server, an optical add-drop multiplexer (OADM), or some other type of device that processes and/or transfers data. Network device 150 may provide functions for a packet-switched core network that supports high-speed wireless and/or wireline broadband access technologies. Examples of network device 150 may include a mobility management entity (MME), a serving gateway (SGW), a packet data network (PDN) gateway (PGW), a radio network controller (RNC), a packet data serving node (PDSN), other 3G network elements, and/or other types of network devices.

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one implementation, network 160 may include an IP core network and/or one or more packet data networks (PDNs).

Server device 170 may include any device that is capable of communicating with client device 110 (e.g., via network 160 and radio access network 130). Server device 1730 may include an application sever to provide applications, data, and/or services to client device 110. In one example implementation, server device 170 may be a web server that hosts a website from which client device 110 can receive applications, data, and/or services. In another example, server device 170 may be a content delivery server that provides broadcast video streams, Video on Demand (VoD) content, and/or other multimedia content. Server device 170 may also include another client device 110.

In implementations described herein, wireless router 120 may act to intercept TCP SYN and/or TCP SYN-ACK messages between client device 110 and server device 170. Wireless router 120 may inspect TCP headers in the TCP SYN and/or TCP SYN-ACK messages and adjust MSS values in the headers to conform to maximum values for air interface 132 to prevent fragmentation. Changes made by wireless router 120 may be transparent to client device 110 and server device 170, such that optimal packet sizes for radio access network 130 may be implemented with existing TCP protocols.

In another implementation, wireless router 120 may generate a message to set the PathMTU value for client device 110 and/or invoke a path MTU discovery procedure for client device 110. Additionally, or alternatively, wireless router 120 may detect a fragmented incoming path MTU discovery packet. If fragmentation of the path MTU discovery packet is needed, wireless router 120 may intercept the path MTU discovery packet and reply to the packet sender (e.g., client device 110 or server device 170) with the optimal MTU value. In one example, wireless router 120 may reply to the packet sender (e.g., client device 110 or server device 170) with an Internet Control Message Protocol (ICMP) "Destination unreachable—fragmentation needed" message that contains the optimal MTU value. Thus, when intercepting a path MTU discovery packet, wireless router 120 may appear to the sending device as the intended recipient device.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
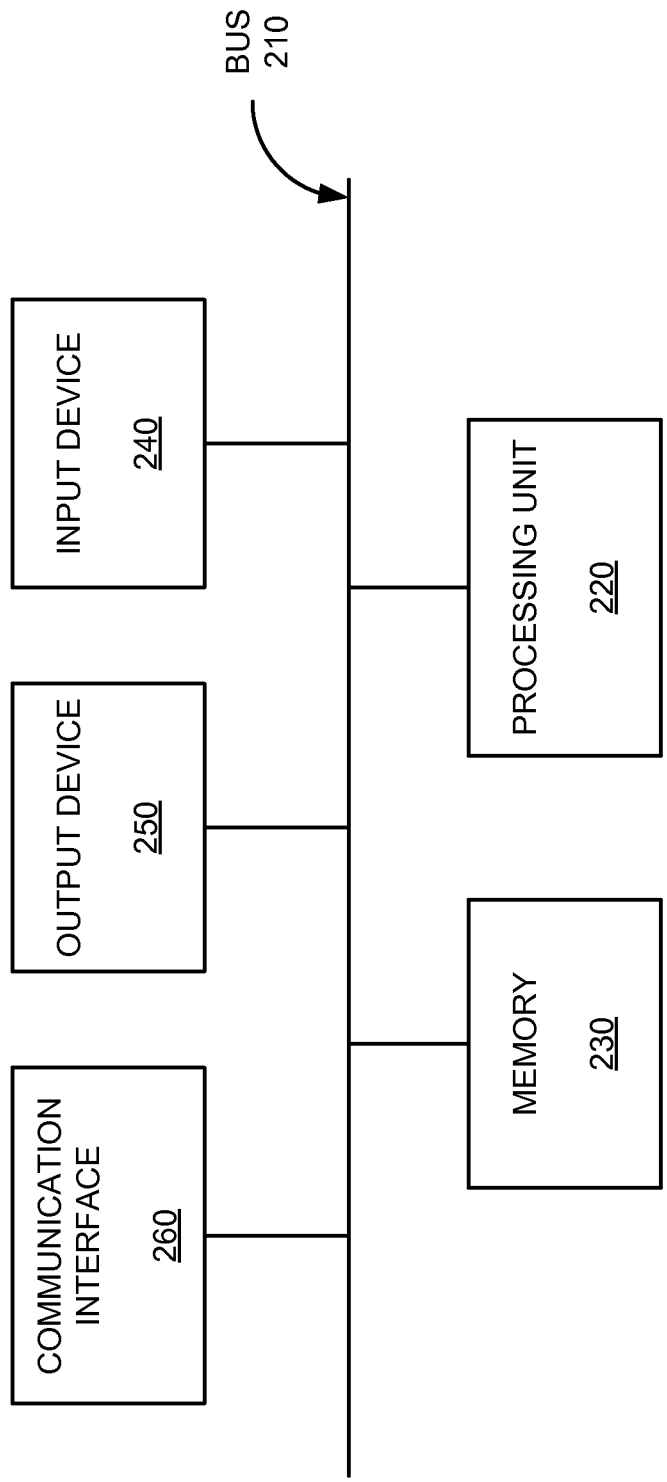
FIG. 2 is a diagram of example components of one or more of the devices of the network depicted in FIG. 1.

FIG. 2 is a diagram of example components of a device 200 that may correspond to one of client device 110, wireless router 120, server device 130, base station 140, or network device 150. Each of client device 110, wireless router 120, server device 130, base station 140, and network device 150 may include one or more devices 200. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a button, a switch, one or more biometric mechanisms, and the like. Output device 250 may include a device that outputs information to the operator, such as a display, a speaker, a light-emitting diode, etc.

Communication interface 260 may include any transceiver-like mechanism that enables device 200 to communicate with other devices and/or systems. For example, communication interface 260 may include mechanisms for communicating with other devices, such as other devices of network 100. In one implementation, communication interface 260 may include an Ethernet interface, an optical interface, or a wireless interface.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
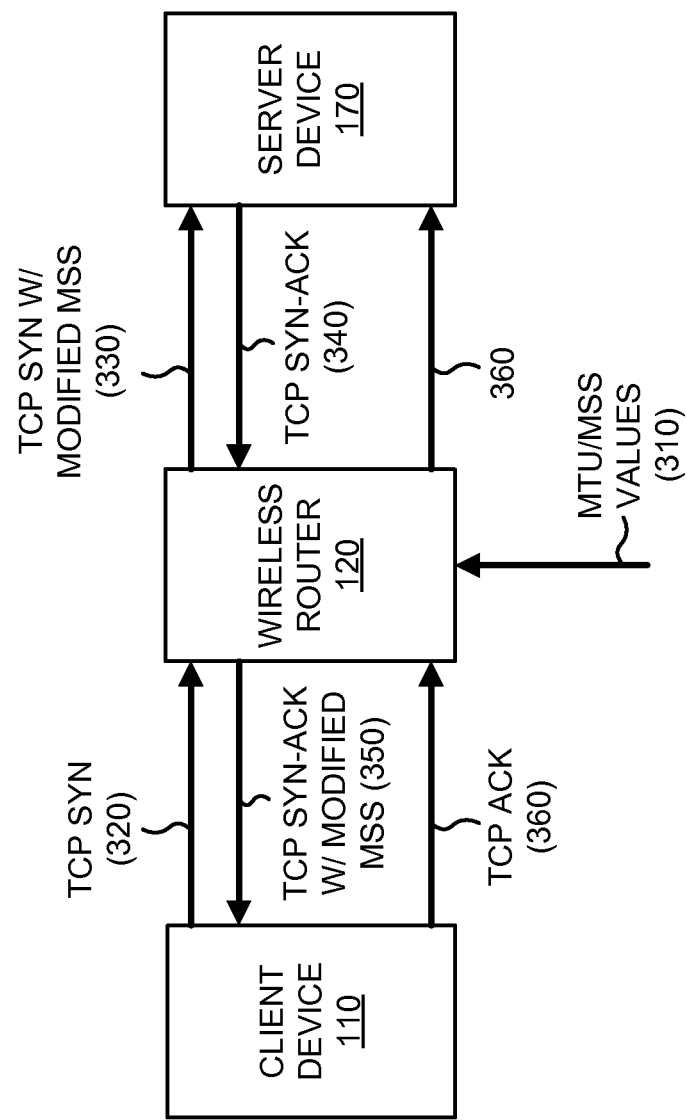
FIG. 3 is a diagram of example interactions between components of an example portion of the network depicted in FIG. 1.

FIG. 3 is a diagram of example interactions between components of an example portion 300 of network 100. As illustrated, example network portion 300 may include client device 110, wireless router 120, and server device 130. Client device 110, wireless router 120, and server device 130 may include the features described above in connection with one or more of FIGS. 1 and 2.

As further shown in FIG. 3, MTU/MSS values 310 may be pre-provisioned in wireless router 120 (e.g., remotely by network device 150 and/or other sources, or locally at a client site). In one implementation, MTU/MSS values 310 may include a TCP MSS value (e.g., in bytes) that is optimal for a particular wireless access network, such as radio access network 130, to prevent fragmentation. In another implementation, MTU/MSS values 310 may include an IP MTU size value from which an optimal TCP MSS value can be derived (e.g., by subtracting the TCP/IP header size of the applicable IP version). For example, wireless router 120 may determine the optimal MSS value from a provisioned IP MTU value by subtracting 40 bytes for an IPv4 header or 60 bytes for an IPv6 header. As another example, wireless router 120 may detect a packet type (e.g., an IPsec packet), determine the header size of the packet type, and subtract the determined header size from the IP MTU size to calculate the optimal TCP MSS value for radio access network 130. MTU/MSS values 310 may be configurable parameters that may be supplied and/or changed based on changes to the IP wireless access network. MTU/MSS values 310 may include different or identical values for uplink and downlink transmissions.

A user (not shown) may utilize client device 110 to initiate a TCP session with server device 130. Client device 110 may initiate a three-way handshake to establish a TCP socket connection over network 100. More particularly, client device 110 may send TCP synchronization (SYN) message 320 toward server device 130 via wireless router 120. TCP SYN message 320 may include, for example, a default MSS value selected by client device 110. The default MSS value of TCP SYN message 320 (e.g., if implemented by server device 130 in a resulting TCP session) may result in transmission of packets that exceed an IP MTU size for radio access network 130.

Wireless router 120 may receive TCP SYN message 320 and may inspect TCP SYN message 320 to identify the MSS value in TCP SYN message 320. Wireless router 120 may compare the MSS value in TCP SYN message 320 with an MSS value (e.g., a downlink value for client device 110) obtained from MTU/MSS values 310. If the MSS value in TCP SYN message 320 is larger than the MSS value obtained from MTU/MSS values 310, wireless router 120 may replace the MSS value in TCP SYN message 320 with the MSS value obtained from MTU/MSS values 310. Wireless router 120 may then forward TCP SYN message 320 with the modified MSS value to server device 130, as indicated by reference number 330. Conversely, if the MSS value in TCP SYN 320 is smaller than the MSS value obtained from MTU/MSS values 310, wireless router 120 may forward TCP SYN message 320 without changing the MSS value (not shown).

Server device 130 may receive modified TCP SYN message 330 and may store the MSS value as a parameter for the TCP session requested by client device 110. In response to modified TCP SYN message 330, server device 130 may send TCP SYN-ACK message 340 to client device 110 (e.g., via wireless router 120). TCP SYN-ACK message 340 may include, for example, a default MSS value selected by server device 130. The default MSS value of TCP SYN-ACK message 340 (e.g., if implemented by client device 110 in a resulting TCP session) may result in transmission of packets that exceed an IP MTU size for radio access network 130.

Wireless router 120 may receive TCP SYN-ACK message 340 and may inspect the TCP SYN-ACK 340 to identify the MSS value in TCP SYN-ACK message 340. Wireless router 120 may compare the MSS value in TCP SYN-ACK message 340 with an MSS value (e.g., an uplink value for client device 110) obtained from MTU/MSS values 310. If the MSS value in TCP SYN-ACK message 340 is larger than the MSS value obtained from MTU/MSS values 310, wireless router 120 may replace the MSS value in TCP SYN-ACK message 340 with the MSS value obtained from MTU/MSS values 310. Wireless router 120 may then forward TCP SYN-ACK message 340 with the modified MSS value to client device 110, as indicated by reference number 350. Conversely, if the MSS value in TCP SYN-ACK message 340 is smaller than the MSS value obtained from MTU/MSS values 310, wireless router 120 may forward TCP SYN-ACK message 340 without changing the MSS value (not shown).

Client device 110 may receive modified TCP SYN-ACK message 350 and may store the MSS value as a parameter for the TCP session requested by client device 110. In response to modified TCP SYN-ACK message 350, client device 110 may send TCP ACK message 360 to server device 130 via wireless router 120. Wireless router 120 may forward TCP ACK message 360 to server device 170 to establish a TCP socket connection over network 100.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
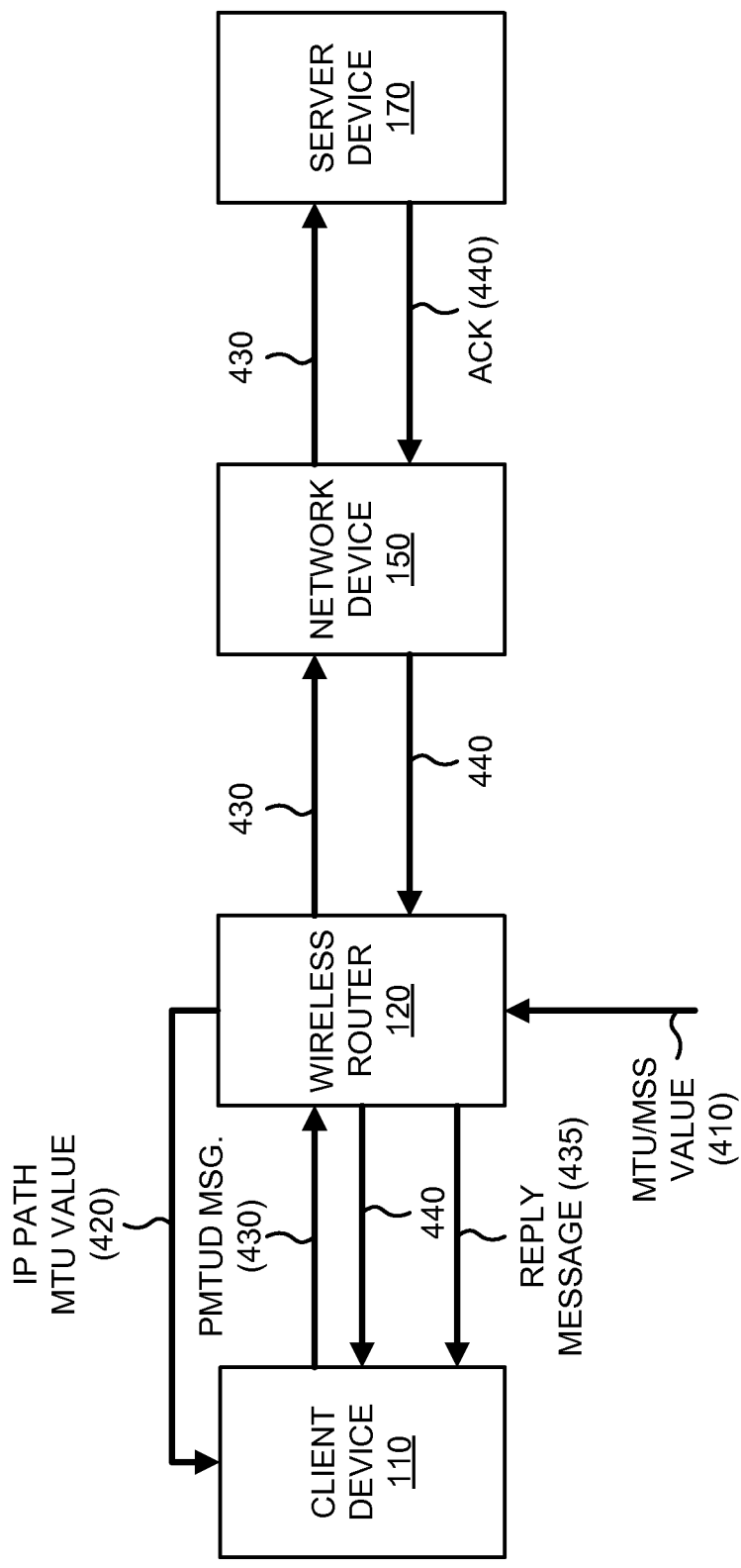
FIG. 4 is a diagram of example interactions between components of another example portion of the network depicted in FIG. 1.

FIG. 4 is a diagram of example interactions between components of another example portion 400 of network 100. As illustrated, example network portion 400 may include client device 110, wireless router 120, server device 170, and network device 150. Client device 110, wireless router 120, server device 170, and network device 150 may include the features described above in connection with one or more of FIGS. 1-3.

As further shown in FIG. 4, MTU/MSS values 410 may be pre-provisioned in wireless router 120 (e.g., by network device 150 and/or other sources). In one implementation, MTU/MSS values 410 may include an IP MTU value (e.g., in bytes) that is optimal for a particular wireless access network, such as radio access network 130, to prevent fragmentation. In another implementation, MTU/MSS values 410 may include a TCP MSS value from which an IP MTU value can be derived. MTU/MSS values 410 may include different or identical values for uplink and downlink transmissions.

Wireless router 120 may convert MTU/MSS value 410 into an IP Path MTU value 420, if necessary, and apply the IP Path MTU value to a particular IP path. For example, if MTU/MSS value 410 includes a TCP MSS value, wireless router 120 may add the TCP/IP header size of the applicable IP version to the TCP MSS value to determine the appropriate IP Path MTU value. Wireless router 120 may send IP Path MTU value 420 to client device 110. For example, wireless router 120 may send IP Path MTU value 420 to client device 110 whenever an IP session is initiated by client device 110 or upon powering up wireless router 120. IP Path MTU value 420 may be included in, for example, a new type of ICMP message (e.g., an ICMPv4 or ICMPv6 message) that provides IP Path MTU value 420 and simultaneously invokes client device 110 to perform a path MTU discovery procedure.

In the context of an IPv6 network, IP Path MTU value 420 may invoke client device 110 to initiate an IP path MTU discovery (PMTUD) message 430. PMTUD message 430 may include a complete or fragmented packet with a "don't fragment" (DF) flag or option bit set in the packet header. Wireless router 120 may receive PMTUD message 430 and may determine whether a size of PMTUD message 430 is greater than an optimal packet size (e.g., MTU/MSS value 410). If the size of PMTUD message 430 is greater than the optimal packet size, wireless router 120 may drop PMTUD message 430 and may reply to client device 110 with an ICMP "Destination unreachable—fragmentation needed" message 435 that includes the optimal packet size (e.g., MTU/MSS value 410). If the size of PMTUD message 430 is less than or equal to the optimal packet size, wireless router 120 may determine whether PMTUD message 430 is fragmented. If PMTUD message 430 is fragmented, wireless router 120 may drop PMTUD message 430 and may reply to client device 110 with the ICMP "Destination unreachable—fragmentation needed" message 435 that includes the optimal packet size (e.g., MTU/MSS value 410). If the size of PMTUD message 430 is less than or equal to the optimal packet size and PMTUD message 430 is complete (i.e., not fragmented), wireless router 120 may forward PMTUD message 430 to server device 170.

In the context of an IPv4 network, IP Path MTU value 420 may invoke client device 110 to initiate an IP path MTU discovery (PMTUD) message 430. Since path discovery in IPv4 typically is conducted between network devices, PMTUD message 430, in an IPv4 context, may include a message to cause wireless router 120 to invoke an IP path MTU discovery procedure and report the results of the IP path MTU discovery procedure to client device 110. Thus, wireless router 120 may verify, to client device 110, if IP path MTU value 420 is valid for the network elements along the path between client device 110 and server device 170.

In an IPv6 context (shown in FIG. 4) and assuming client device 110 is not using IP path MTU, IP Path MTU value 420 may instruct client device 110 to utilize IP path MTU. In one implementation, client device 110 may need install software to invoke IP path MTU. If IP Path MTU value 420 is valid for all the network elements along the path between client device 110 and server device 170, PMTUD message 430 may transit through network device 150 to server device 170. Server device 170 may respond to PMTUD message 430 with an acknowledgement (ACK) 440 that PMTUD message 430 was received, signifying IP path MTU value 420 is valid for the connection between client device 110 and server device 170. Network device 150 may receive ACK 440 and forward ACK 440 to client device 110 via wireless router 120.

In an IPv4 context (not shown) and if IP Path MTU value 420 is valid for all the network elements along the path between client device 110 and server device 170, a network element (e.g., another network device) may respond to PMTUD message 430 with an acknowledgement (ACK) that PMTUD message 430 was received, signifying IP path MTU value 420 is valid for the connection between client device 110 and server device 170. Network device 150 may receive the ACK and forward the ACK to wireless router 120. Wireless router 120 may, in turn, confirm the PMTUD value to client device 110.

Additionally, or alternatively, if PMTUD message 430, or another PMTUD message from a different device (e.g., network device 150 or server device 170) with an MTU that is smaller than that of IP path value 420 reaches wireless router 120, wireless router 120 may drop PMTUD message 430 and may reply to the packet sender (e.g., client device 110 or server device 170) with the ICMP "Destination unreachable—fragmentation needed" message 435 that includes the optimal MTU value.

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

Figure 5:
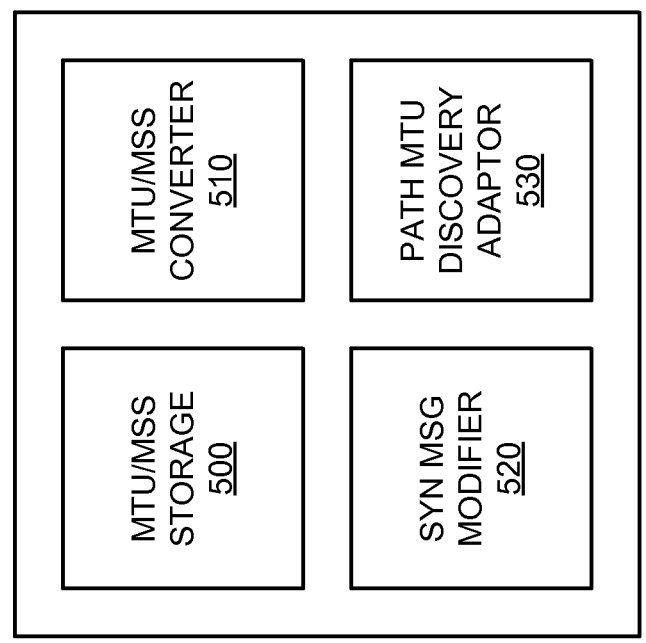
FIG. 5 is a diagram of example functional components of a wireless modem of the network illustrated in FIG. 1.

FIG. 5 is a diagram of example functional components of wireless router 120. In one implementation, the functions described in connection with FIG. 5 may be performed by one or more components of device 200 (FIG. 2) or one or more devices 200. As shown in FIG. 5, wireless router 120 may include MTU/MSS storage 500, an MTU/MSS converter 510, a SYN message modifier 520, and a path MTU discovery adaptor 530.

MTU/MSS storage 500 may receive (e.g., over a network interface) a TCP MSS value and/or an IP MTU value that is optimally sized to prevent packet fragmentation over a wireless air interface (e.g., radio access network 130) associated with wireless router 120. MTU/MSS storage 500 may store the TCP MSS value and/or IP MTU value.

MTU/MSS converter 510 may read the TCP MSS value and/or IP MTU value from MTU/MSS storage 500 and convert the value into a format appropriate for a particular packet size function. For example, if only an IP MTU value is included in MTU/MSS storage 500, MTU/MSS converter 510 may calculate a corresponding TCP MSS value by subtracting the number of bytes for IP/TCP headers based on the application IP version (e.g., 40 bytes for IPv4 or 60 bytes for IPv6). As another example, MTU/MSS converter 510 may determine a packet header size (e.g., an IPsec packet) of a TCP SYN or TCP-SYN-ACK message and subtract the determined header size from the IP MTU size to calculate the optimal TCP MSS value for radio access network 130. In another implementation, MTU/MSS converter 510 may be configured to account for additional layer headers that may impact the optimal MTU/MSS values to prevent packet fragmentation over the wireless air interface. MTU/MSS converter 510 may store the calculated optimal MSS value or other calculated values in MTU/MSS storage 500.

SYN message modifier 520 may identify and intercept TCP SYN and/or TCP SYN-ACK messages (e.g., from client device 110 and/or server device 170). SYN message modifier 520 may identify the MSS value in the TCP SYN and/or TCP SYN-ACK messages and compare the MSS value to a corresponding MSS value stored in MTU/MSS storage 500. If the MSS value in the TCP SYN and/or TCP SYN-ACK message is larger than the corresponding MSS value stored in MTU/MSS storage 500, SYN message modifier 520 may replace the original MSS value in the TCP SYN and/or TCP SYN-ACK message with the corresponding MSS value stored in MTU/MSS storage 500.

Path MTU discovery adaptor 530 may read the optimal MTU value from MTU/MSS storage 500 and apply the optimal MTU value to IP path MTU discovery procedures. Path MTU discovery adaptor 530 may also generate a new type of ICMP message to set the PathMTU value for a client device (e.g., client device 110) and invoke a path MTU discovery procedure for the client device. Additionally, or alternatively, path MTU discovery adaptor 530 may detect a complete or fragmented path MTU discovery packet with a DF option bit set in the packet header. Path MTU discovery adaptor 530 may determine whether a size of the path MTU discovery packet is greater than an optimal packet size. If the size of the path MTU discovery packet is greater than the optimal packet size, path MTU discovery adaptor 530 may intercept or drop the path MTU discovery packet and may reply to the packet sender (e.g., client device 110 or server device 170) with message 435 that includes the optimal MTU value from MTU/MSS storage 500. If the size of the path MTU discovery packet is less than or equal to the optimal packet size, path MTU discovery adaptor 530 may determine whether the path MTU discovery packet is fragmented. If the path MTU discovery packet is fragmented, path MTU discovery adaptor 530 may intercept or drop the path MTU discovery packet and may reply to the packet sender with message 435 that includes the optimal MTU value from MTU/MSS storage 500. If the size of the path MTU discovery packet is less than or equal to the optimal packet size and the path MTU discovery packet is complete (i.e., not fragmented), path MTU discovery adaptor 530 may forward the path MTU discovery packet to a destination device. When intercepting a path MTU discovery packet, path MTU discovery adaptor 530 may cause wireless router 120 to appear to the sending device (e.g., client device 110) as the intended recipient device (e.g., server device 170).

Although FIG. 5 shows example functional components of wireless router 120, in other implementations, wireless router 120 may contain different functional components, differently arranged functional components, or additional functional components than depicted in FIG. 5. Alternatively, or additionally, one or more functional components of wireless router 120 may perform one or more other tasks described as being performed by one or more other functional components of wireless router 120. Furthermore, in another implementation, one or more functional components of wireless router 120 may be performed by another device in network 100, such as base station 140 or network device 150.

Figure 6A:
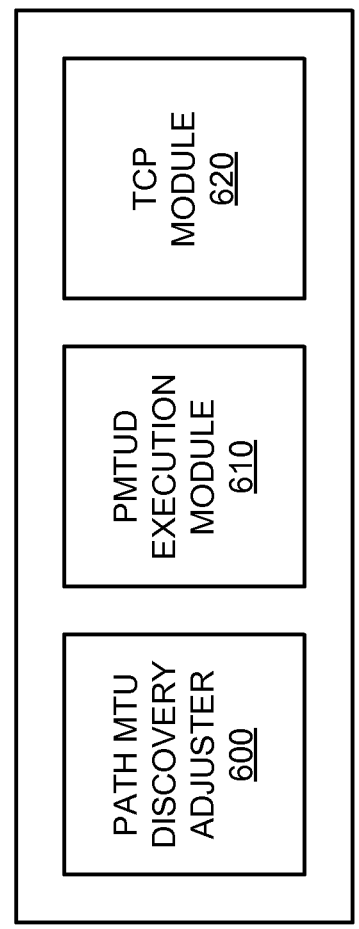
FIGS. 6A and 6B are diagrams of example functional components of a client device or a server device illustrated in FIG. 1.
Figure 6B:
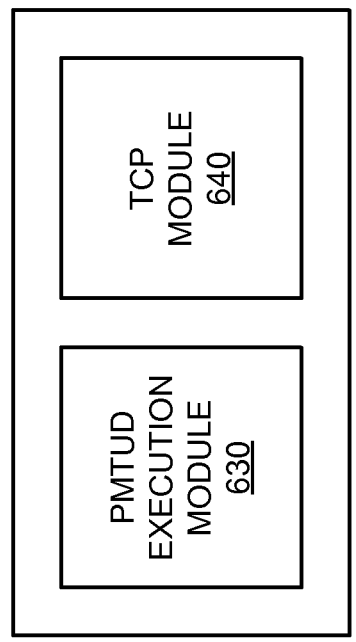

FIGS. 6A and 6B are diagrams of example functional components of client device 110. FIG. 6A provides example functional components of client device 110 using IPv4; while FIG. 6B provides example functional components of client device 110 using IPv6. In one implementation, the functions described in connection with FIGS. 6A and 6B may be performed by one or more components of device 200 (FIG. 2) or one or more devices 200. As shown in FIG. 6A, client device 110 may include path MTU discovery adjuster 600, PMTUD execution module 610, and TCP module 620.

MTU discovery adjuster 600 may receive a message (e.g., an ICMP-type message) from wireless router 120 (e.g., path MTU discovery adaptor 530) that sets a PathMTU value for the client device that is optimally-sized to prevent packet fragmentation over a wireless air interface (e.g., air interface 132) associated with wireless router 120. Based on the message from wireless router 120, MTU discovery adjuster 600 may set the IP PathMTU packet size and invoke a path MTU discovery procedure. For example, MTU discovery adjuster 600 may provide the optimal path MTU value to PMTUD execution module 610 and instruct PMTUD execution module 610 to conduct path MTU discovery using the optimal path MTU value.

PMTUD execution module 610 may receive, from MTU discovery adjuster 600, the optimal path MTU packet size and instructions to invoke a PathMTU discovery procedure. In an IPv4 context, PMTUD execution module 610 may, for example, send instructions to wireless router 120 to execute a PathMTU discovery procedure between network devices within network 100. In another implementation, PMTUD execution module 610 may include instructions to execute path MTU discovery in the IPv4 protocol stack for client device 110.

TCP module 620 may execute TCP functions on client device 110. In one implementation, TCP module 620 may include the native IPv4/TCP protocol stack for client device 110. For example, TCP module 620 may perform a TCP three-way handshake to establish a TCP socket connection over network 100. According to an implementation described herein, TCP module 620 may receive a TCP SYN message or a TCP SYN-ACK message with an MSS values (e.g., as modified by wireless router 120) that is optimally sized to prevent packet fragmentation over a wireless air interface (e.g., air interface 132) associated with wireless router 120. TCP module 620 may thus apply the optimized MSS value without modification to typical IPv4/TCP functions.

FIG. 6B is a diagram of example functional components of client device 110 using IPv6. As shown in FIG. 6B, client device 110 may include PMTUD execution module 630, and TCP module 640, but may not include path MTU discovery adjuster 600.

PMTUD execution module 630 may receive, a message (e.g., an ICMP-type message) from wireless router 120 (e.g., path MTU discovery adaptor 530) that invokes a PathMTU discovery procedure. In an IPv6 context, PMTUD execution module 630 may receive the message from wireless router 120 and may execute the PathMTU discovery procedure as an end-to-end discovery between client device 110 and server device 170. If the size of the PathMTU discovery packet is too large for radio access network 130, PMTUD execution module 630 may receive (e.g., from wireless router 120 acting as server 170) a fragmentation indication message (e.g., message 435) with the optimal MTU value for radio access network 130 (e.g., from MTU/MSS storage 500). PMTUD execution module 630 may then repeat the PathMTU discovery procedure with the optimal MTU value.

TCP module 640 may execute TCP functions on client device 110. In one implementation, TCP module 640 may include the native IPv6/TCP protocol stack for client device 110. For example, TCP module 640 may perform a TCP three-way handshake to establish a TCP socket connection over network 100.

Although FIGS. 6A and 6B shows example functional components of client device 110, in other implementations, client device 110 may contain different functional components, differently arranged functional components, or additional functional components than depicted in FIGS. 6A and 6B. Alternatively, or additionally, one or more functional components of client device 110 may perform one or more other tasks described as being performed by one or more other functional components of client device 110. Furthermore, in another implementation, one or more functional components of client device 110 may be performed by another device in network 100, such as server device 170.

FIG. 7 is a flow chart of an example process 700 for setting an optimal packet size for a wireless access network according to an implementation described herein. In one implementation, process 700 may be performed by wireless router 120. In another implementation, some or all of process 700 may be performed by another device or group of devices, including or excluding wireless router 120.

As illustrated in FIG. 7, process 700 may include receiving and/or calculating an optimal packet-size value for a wireless access network (block 710). For example, in implementations described above in connection with FIG. 3, MTU/MSS values 310 may be pre-provisioned in wireless router 120 (e.g., by network device 150 and/or other sources). In one implementation, MTU/MSS values 310 may include a TCP MSS value (e.g., in bytes) that is optimal for a particular wireless access network, such as radio access network 130, to prevent fragmentation. In another implementation, MTU/MSS values 310 may include an IP MTU size value from which an optimal TCP MSS value can be derived (e.g., by subtracting the TCP/IP header size of the applicable IP version).

As further shown in FIG. 7, process 700 may include receiving a TCP SYN message with a first MSS value for a proposed TCP socket connection between a first device and a second device (block 720), replacing the first MSS value with the optimal packet size value if the first MSS value is greater than the optimal packet size value (block 730), and forwarding the modified TCP SYN message to the second device (block 740). For example, in implementations described above in connection with FIG. 3, client device 110 may initiate a three-way handshake to establish a TCP socket connection over network 100.

More particularly, client device 110 may send TCP SYN message 320 toward server device 170 via wireless router 120. TCP SYN message 320 may include, for example, a default MSS value selected by client device 110. The default MSS value of TCP SYN message 320 (e.g., if implemented by server device 170 in a resulting TCP session) may result in transmission of packets that exceed an IP MTU size for radio access network 130. Wireless router 120 may receive TCP SYN message 320 and may inspect the TCP SYN message 320 to identify the MSS value in TCP SYN message 320. Wireless router 120 may compare the MSS value in TCP SYN message 320 with an MSS value (e.g., a downlink value for client device 110) obtained from MTU/MSS values 310. If the MSS value in TCP SYN message 320 is larger than the MSS value obtained from MTU/MSS values 310, wireless router 120 may replace the MSS value in TCP SYN message 320 with the MSS value obtained from MTU/MSS values 310. Wireless router 120 may then forward the TCP SYN message with the modified MSS value to server device 170, as indicated by reference number 330. If the MSS value in TCP SYN message 320 is smaller than the MSS value obtained from MTU/MSS values 310, wireless router 120 may forward TCP SYN message 320 without changing the MSS value.

Returning to FIG. 7, process 700 may include receiving a TCP SYN-ACK message with server second MSS value for the proposed TCP socket connection (block 750), and replacing the second MSS value with the optimal packet size value if the second MSS value is greater than the optimal packet size value (block 760), and forwarding the modified TCP SYN-ACK message to the first device (block 770).

For example, in implementations described above in connection with FIG. 3, server device 170 may send TCP SYN-ACK message 340 to client device 110 (e.g., via wireless router 120) in response to modified TCP SYN message 330. TCP SYN-ACK message 340 may include, for example, a default MSS value selected by server device 170. The default MSS value of TCP SYN-ACK message 340 (e.g., if implemented by client device 110 in a resulting TCP session) may result in transmission of packets that exceed an IP MTU size for radio access network 130. Wireless router 120 may receive TCP SYN-ACK message 340 and may inspect the TCP SYN-ACK message 340 to identify the MSS value in TCP SYN-ACK message 340. Wireless router 120 may compare the MSS value in TCP SYN-ACK message 340 with an MSS value (e.g., an uplink value for client device 110) obtained from MTU/MSS values 310. If the MSS value in TCP SYN-ACK message 340 is larger than the MSS value obtained from MTU/MSS values 310, wireless router 120 may replace the MSS value in TCP SYN-ACK message 340 with the MSS value obtained from MTU/MSS values 310. Wireless router 120 may then forward the TCP SYN-ACK message with the modified MSS value to server device 170, as indicated by reference number 350. If the MSS value in TCP SYN-ACK message 340 is smaller than the MSS value obtained from MTU/MSS values 310, wireless router 120 may forward TCP SYN-ACK message 340 without changing the MSS value.

FIG. 8 is a flow chart of an example process 800 for signaling an optimal MTU size in a wireless access network according to an implementation described herein. In one implementation, process 800 may be performed by wireless router 120. In another implementation, some or all of process 800 may be performed by another device or group of devices, including or excluding wireless router 120.

As illustrated in FIG. 8, process 800 may include receiving and/or calculating an optimal IP MTU value for a wireless access network (block 810), and storing and/or applying the optimal IP MTU value to a path MTU (block 820). For example, in implementations described above in connection with FIG. 4, MTU/MSS values 410 may be pre-provisioned in wireless router 120 (e.g., by network device 150 and/or other sources). In one implementation, MTU/MSS values 410 may include an IP MTU value (e.g., in bytes) that is optimal for a particular wireless access network, such as radio access network 130, to prevent fragmentation. In another implementation, MTU/MSS values 410 may include a TCP MSS value from which an IP MTU value can be derived. Wireless router 120 may convert MTU/MSS value 410 into an IP Path MTU value 420, if necessary, and apply the IP Path MTU value to a particular IP path.

Returning to FIG. 8, process 800 may include supplying the optimal packet size value to a client device (block 830) and invoking a path MTU discovery procedure by the client device (block 840). For example, in implementations described above in connection with FIG. 4, wireless router 120 may send IP Path MTU value 420 to client device 110. For example, wireless router 120 may send IP Path MTU value 420 to client device 110 whenever an IP session is initiated by client device 110 or upon powering up of wireless router 120. IP Path MTU value 420 may be included in, for example, a new type of Internet Control Message Protocol (ICMP) message (e.g., an ICMPv4 or ICMPv6 message) that provides IP Path MTU value 420 and/or simultaneously invokes client device 110 to perform a path MTU discovery procedure.

Referring again to FIG. 8, process 800 may include providing an optimal packet size value to a sending device if a fragmented PMTUD packet is detected (block 850). For example, in implementations described above in connection with FIG. 5, wireless router 120 (e.g., path MTU discovery adaptor 530) may detect a fragmented path MTU discovery packet. If path MTU discovery adaptor 530 detects the fragmented path MTU discovery packet, path MTU discovery adaptor 530 may intercept the path MTU discovery packet and reply to the packet sender (e.g., client device 110 or server device 170) with the optimal MTU value from MTU/MSS storage 500. Thus, when intercepting a path MTU discovery packet, path MTU discovery adaptor 530 may cause wireless router 120 to appear to the sending device (e.g., client device 110 or server device 170) as the intended recipient device (e.g., server device 170 or client device 110).

FIG. 9 is a flow chart of an example modified path MTU discovery process 900 according to an implementation described herein. In one implementation, process 900 may be performed by wireless router 120. In another implementation, some or all of process 900 may be performed by another device or group of devices, including or excluding wireless router 120.

As illustrated in FIG. 9, process 900 may include receiving and/or calculating an optimal packet size value for a wireless access network (block 910), and receiving, from a source device, a path MTU discovery (PMTUD) packet with a don't fragment (DF) option bit set (block 920). For example, in implementations described above in connection with FIGS. 3 and 4, MTU/MSS values 310 may be pre-provisioned in wireless router 120 (e.g., by network device 150 and/or other sources). In one example, MTU/MSS values 310 may include a TCP MSS value (e.g., in bytes) that is optimal for a particular wireless access network, such as radio access network 130, to prevent fragmentation. In another example, MTU/MSS values 310 may include an IP MTU size value from which an optimal TCP MSS value can be derived (e.g., by subtracting the TCP/IP header size of the applicable IP version). PMTUD message 430 may include a complete or fragmented packet with a DF flag or option bit set in the packet header. Wireless router 120 may receive PMTUD message 430.

As further shown in FIG. 9, process 900 may include determining whether a size of the PMTUD packet is greater than the optimal packet size value (block 930). If the PMTUD packet size is greater than the optimal packet size value (block 930—YES), process 900 may include dropping the PMTUD packet and replying to the source device with a "destination unreachable—fragmentation needed" message containing the optimal packet size (block 940). For example, in implementations described above in connection with FIG. 4, wireless router 120 may determine whether a size of PMTUD message 430 is greater than an optimal packet size (e.g., MTU/MSS value 410). If the size of PMTUD message 430 is greater than the optimal packet size, wireless router 120 may drop PMTUD message 430 and may reply to client device 110 with an ICMP "Destination unreachable—fragmentation needed" message 435 that includes the optimal packet size (e.g., MTU/MSS value 410).

Returning to FIG. 9, if the PMTUD packet size is less than or equal to the optimal packet size value (block 930—NO), process 900 may include determining whether the PMTUD packet is fragmented (block 950). If the PMTUD packet is fragmented (block 950—YES), process 900 may return to block 940. If the PMTUD packet is not fragmented (block 950—NO), process 900 may include forwarding the PMTUD packet to a destination device (block 960). For example, in implementations described above in connection with FIG. 4, if the size of PMTUD message 430 is less than or equal to the optimal packet size, wireless router 120 may determine whether PMTUD message 430 is fragmented. If PMTUD message 430 is fragmented, wireless router 120 may drop PMTUD message 430 and may reply to client device 110 with the ICMP "Destination unreachable—fragmentation needed" message 435 that includes the optimal packet size (e.g., MTU/MSS value 410). If the size of PMTUD message 430 is less than or equal to the optimal packet size and PMTUD message 430 is complete (i.e., not fragmented), wireless router 120 may forward PMTUD message 430 to server device 170.

Systems and/or methods described herein may provide communications between a network device, associated with a wireless access network, and end users to control a maximum packet size for devices communicating over the wireless access network. The maximum packet size may be configured to reduce/eliminate packet fragmentation over the wireless access network. In one implementation, the systems and/or methods may intercept TCP synchronization messages to replace MSS values with values configured to prevent fragmentation over the wireless access network. In another implementation, the systems and/or methods may provide configured MTU values to end user devices to initiate PathMTU discovery procedures using the configured MTU values.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions, described herein, may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a network device, one or more maximum size values for a wireless access network associated with the network device, wherein the one or more maximum size values are calculated to prevent fragmentation over the wireless access network;
   sending, by the network device and to a first computing device, an IP path maximum transfer unit (MTU) value that is based on the one or more maximum size values, wherein the sending is performed when an IP session is initiated by the first computing device or when powering up the network device, and wherein the IP path MTU value invokes the first computing device to initiate an IP path MTU discovery (PMTUD) message;
   receiving, by the network device and from the first computing device, the IP PMTUD message, wherein the IP PMTUD message instructs the network device to invoke an IP path MTU discovery procedure for a path between the first computing device and a second computing device, and wherein the IP PMTUD message further instructs the network device to report results of the IP path MTU discovery procedure to the first computing device; and
   forwarding, by the network device, the results of the IP path MTU discovery procedure to the first computing device.

2. The method of claim 1, further comprising:
   receiving, from the second computing device, a synchronization message including an initial maximum segment size value for a TCP socket connection between the first computing device and the second computing device;
   replacing an initial maximum segment size value with one of the one or more maximum size values to create a modified synchronization message; and
   forwarding, by the network device, the modified synchronization message to the first computing device.

3. The method of claim 2, where the one or more maximum size values include:
   an uplink value optimized to prevent fragmentation over the wireless access network for transmissions between the first computing device and the second computing device in a first direction, and
   a downlink value, different than the uplink value, optimized to prevent fragmentation over the wireless access network for transmissions between the first computing device and the second computing device in a second direction.

4. The method of claim 1, where the wireless access network includes:
   a CDMA2000 network;
   a Global System for Mobile Communications (GSM) network;
   a Long Term Evolution (LTE) network; or
   a WiMax network.

5. The method of claim 1, where the network device comprises a wireless router for forwarding traffic over the wireless access network.

6. The method of claim 1, wherein the one or more maximum size values include:
   a TCP maximum segment size (MSS) value.

7. The method of claim 6, further comprising:
   calculating, based on a TCP/IP header size and the TCP MSS value, the IP path MTU value, and
   storing the calculated IP path MTU value as one of the one or more maximum size values.

8. The method of claim 1, wherein sending the IP path MTU value that is based on the one or more maximum size values, includes sending, to the first computing device, a control message.

9. A device, comprising:
   a memory; and
   a processor to:
      receive a maximum size value for a wireless access network associated with the device, wherein the maximum size value is calculated to prevent fragmentation over an Internet Protocol (IP) wireless access network,
      store the maximum size value in the memory, and
      send, to a client device, an IP path maximum transfer unit (MTU) value that is based on the maximum size value, wherein the sending is performed when an IP session is initiated by the client device or in response to powering up the device, and wherein the IP path MTU value invokes the client device to initiate an IP path MTU discovery (PMTUD) message using the IP path MTU value.

10. The device of claim 9, wherein the processor is further to:

identify an uplink maximum segment size value for the wireless access network, wherein the uplink maximum segment size value is calculated to prevent fragmentation over the IP wireless access network, store the uplink maximum segment size value in the memory, receive, from a server device, another synchronization message including an initial maximum segment size value for a TCP socket connection between the client device and the server device;

replace the initial maximum segment size value with the uplink maximum segment size value, from the memory, to create a modified synchronization message; and forward the other modified synchronization message to the client device.

11. The device of claim 9, wherein the maximum size value includes:

an Internet Protocol (IP) maximum transfer unit (MTU) value, or a TCP maximum segment size (MSS) value.

12. The device of claim 9, wherein the processor is further to:

receive, from the client device, the IP PMTUD message, wherein the IP PMTUD message instructs the device to invoke an IP path MTU discovery procedure for a path between the client device and a server device, and wherein the IP PMTUD message further instructs the device to report results of the IP path MTU discovery procedure to the client device, and forward the results of the IP path MTU discovery procedure to the client device.

13. The device of claim 9, wherein, when identifying the maximum size value, the processor is further to:

identify a Transmission Control Protocol (TCP) maximum segment size (MSS) value, and calculate the IP path MTU value, based on a TCP/IP header size and the TCP MSS value.

14. The device of claim 9, wherein the device comprises: a wireless router providing LTE network connectivity.

15. The device of claim 9, wherein, when sending the IP path MTU value, the processor is further to:

send, to the client device, the IP path MTU value as part of an Internet Control Message Protocol (ICMP) message.

16. A non-transitory computer-readable medium comprising [one or more] computer-executable instructions which when executed by a computer cause the computer to:

receive information indicating a configured maximum segment size value for a wireless access network, wherein the configured maximum segment size value is calculated to prevent fragmentation for transmissions over the wireless access network;

identify, based on the information indicating the configured maximum segment size value, an Internet Protocol (IP) maximum transfer unit (MTU) value for the wireless access network, wherein the IP MTU value is calculated to prevent fragmentation over the wireless access network;

send, to a client device when an IP session is initiated by the client device, a control message to invoke a path MTU discovery procedure, by the client device, using the IP MTU value;

receive, from the client device, a Transmission Control Protocol (TCP) synchronization message including an initial maximum segment size value for a TCP socket connection between the client device and a server device;

determine that the initial maximum segment size value is larger than the configured maximum segment size value;

replace the initial maximum segment size value with the configured maximum segment size value to create a modified TCP synchronization message, when the initial maximum segment size value is larger than the configured maximum segment size value;

forward the modified TCP synchronization message to the server device;

receive, from the server device, another TCP synchronization message including another initial maximum segment size value for the TCP socket connection between the client device and the server device;

determine that the other initial maximum segment size value is larger than the configured maximum segment size value;

replace the other initial maximum segment size value with the configured maximum segment size value to create another modified TCP synchronization message; and forward the other modified synchronization message to the client device to establish a TCP socket connection between the client device and the server device.

17. The computer-readable memory of claim 16, wherein the control message includes an Internet Control Message Protocol (ICMP) message that is generated whenever an IP session is initiated by the client device.

* * * * *